(12) United States Patent
Lim

(10) Patent No.: US 9,083,592 B2
(45) Date of Patent: Jul. 14, 2015

(54) APPARATUS AND METHOD FOR TRANSCEIVING DATA

(75) Inventor: Jong Soo Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 13/882,075

(22) PCT Filed: Oct. 21, 2011

(86) PCT No.: PCT/KR2011/007890
§ 371 (c)(1),
(2), (4) Date: Apr. 26, 2013

(87) PCT Pub. No.: WO2012/053859
PCT Pub. Date: Apr. 26, 2012

(65) Prior Publication Data
US 2013/0259160 A1    Oct. 3, 2013

(30) Foreign Application Priority Data
Oct. 22, 2010 (KR) .................... 10-2010-0103439
Oct. 21, 2011 (KR) .................... 10-2011-0107788

(51) Int. Cl.
*H04K 1/10* (2006.01)
*H04L 27/28* (2006.01)
*H04L 27/26* (2006.01)

(52) U.S. Cl.
CPC ........ *H04L 27/2615* (2013.01); *H04L 27/2614* (2013.01)

(58) Field of Classification Search
USPC ........................................................ 375/260
See application file for complete search history.

(56) References Cited

U.S. PATENT DOCUMENTS

2008/0260065 A1* 10/2008 Ojard ............................. 375/295
2011/0051836 A1*  3/2011 Lee ................................ 375/268

FOREIGN PATENT DOCUMENTS

JP      2010-050936 A    3/2010
KR   1020090040914 A    4/2009

OTHER PUBLICATIONS

Byoung-Jo Choi, Crest Factors of 16-QAM Modulated Multicode MC-CDMA Signals Employing Complementary Sequences, Journal of KICS, Sep. 2006, pp. 817-824, vol. 31.

* cited by examiner

*Primary Examiner* — Tanmay Shah
(74) *Attorney, Agent, or Firm* — Rabin & Berdo, P.C.

(57) ABSTRACT

A data transmitting apparatus generates a plurality of modulation data symbols by symbol-mapping a plurality of input data signals, converts the plurality of modulation data symbols to a real signal of a time domain from a frequency domain, performs angle modulation of the signal, and controls and transmits the size of a sine signal of the angle-modulated real signal with a gain varying according to a control signal.

20 Claims, 13 Drawing Sheets

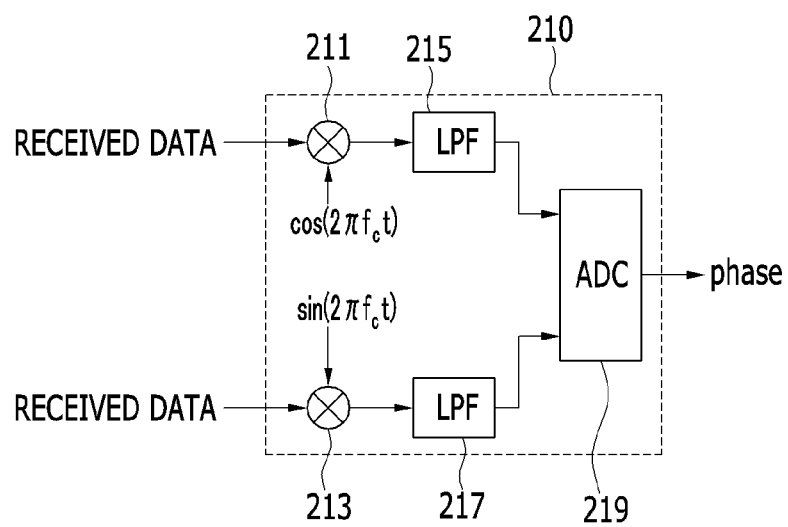
Figure 12
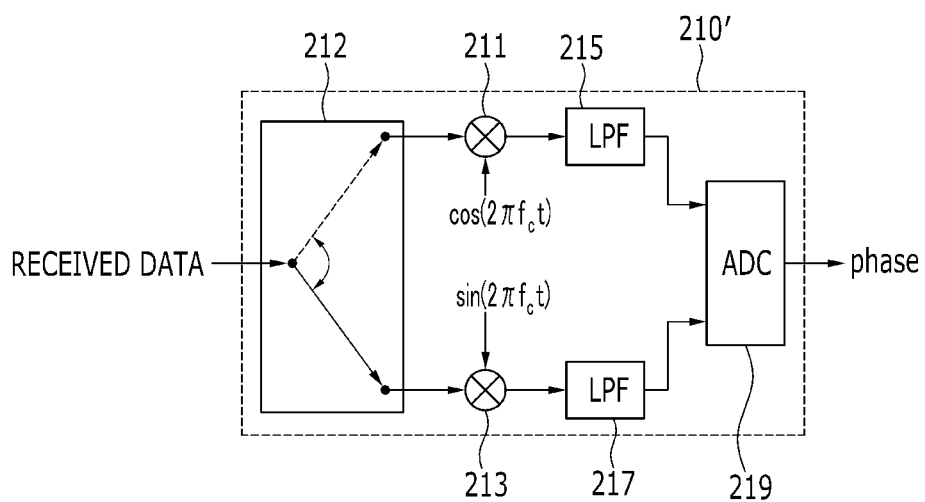
【Figure 13】

APPARATUS AND METHOD FOR TRANSCEIVING DATA

TECHNICAL FIELD

The present invention relates to a method and apparatus for transmitting/receiving data. More particularly, the present invention relates to a method and apparatus for transmitting/receiving data that control a peak-to-average power ratio (PAPR) in a communication system that transmits data using an orthogonal frequency-division multiplexing (OFDM) method.

BACKGROUND ART

OFDM can be embodied through a simple equalizer, and has a characteristic that it is strong against multipath fading and is selected and used for several wireless communication systems such as a wireless local area network (WLAN), a wireless metropolitan area network (WMAN), a digital audio broadcast (DAB) network, and a digital video broadcast (DVB) network.

However, because OFDM use many carrier waves, signals of the same phase are combined and thus a high peak-to-average power ratio (PAPR) occurs, and due to a high PAPR, an operation point of a power amplifier of an OFDM transmitter is positioned at a non-linear area and thus non-linear distortion of a signal occurs. Therefore, in an OFDM system, a power amplifier is backed off to reduce influence of a PAPR, and when enough backoff is not given to the power amplifier, a frequency spectrum of the system is widened and distortion by modulation between mutual frequencies occurs and system performance is resultantly deteriorated.

It is essential to lower the PAPR for power efficiency and down-sizing of an OFDM transmitter, but there is a drawback that when the PAPR is lowered, receiving performance is deteriorated.

Further, in visible light communication (VLC) using OFDM, it is efficient to lower the PAPR to 0 dB, but in a case of optical communication instead of using light such as infrared rays, it is necessary to raise the PAPR for receiving performance. That is, in an OFDM system, when the PAPR can be adjusted according to a receiving environment, performance of the system can be improved.

As a method of lowering the PAPR in the OFDM system, various methods such as a block coding method and a clipping method have been suggested, but these methods cannot lower the PAPR to 0 dB, and it is not allowed to change the PAPR according to a receiving environment.

DISCLOSURE

Technical Problem

The present invention has been made in an effort to provide a method and apparatus for transmitting/receiving data having advantages of controlling a PAPR according to a receiving environment.

Technical Solution

An exemplary embodiment of the present invention provides a data transmitting apparatus. The data transmitting apparatus includes a symbol mapper, a normalizing and real signal converter, an angle modulation unit, a PAPR control and power normalizing unit, and a signal transmitter. The symbol mapper generates a plurality of modulation data symbols by performing symbol mapping of an input signal. The normalizing and real signal converter converts the plurality of modulation data symbols to a real signal of a time domain from a frequency domain. The angle modulation unit performs angle modulation of the real signal. The PAPR control and power normalizing unit controls the size of a sine component of an angle-modulated real signal according to a first gain and power-normalizes a sine component and a cosine component of the real signal. The signal transmitter converts and transmits the power-normalized real signal to a radio frequency signal.

The PAPR control and power normalizing unit may vary the first gain according to the input control signal.

The normalizing and real signal converter may include a normalizing unit that normalizes power of the plurality of modulation data symbols so that average power of the plurality of modulation data symbols becomes 1.

The normalizing and real signal converter may include: an inverse fast Fourier converter that performs inverse fast Fourier conversion of a plurality of input signals; and an input signal processor that outputs the plurality of modulation data symbols and a plurality of conjugate complex symbols that are generated by conjugating the plurality of modulation data symbols to the inverse fast Fourier converter.

The angle modulation unit may include a phase controller that controls the size of the real signal according to a second gain; and a modulator that angle-modulates the real signal to a cosine signal and a sine signal.

The PAPR control and power normalizing unit may include: a PAPR controller that controls the size of a sine component of the angle-modulated real signal according to the first gain; a first multiplier that generates a baseband I signal by multiplying a setting value for power normalization by a cosine component of the real signal; and a second multiplier that generates a baseband Q signal by multiplying the setting value by a sine component of the real signal of which the size is controlled according to the first gain.

When the first gain is 1, the PAPR may become 0.

Another embodiment of the present invention provides a data receiving apparatus. The data receiving apparatus includes a receiving signal processor, a power compensation unit, an angle demodulation unit, a normalizing and real signal inverse converter, a symbol demapper, and a parallel to serial converter. The receiving signal processor outputs a phase signal from a digital signal corresponding to received data. The power compensation unit compensates a size of the phase signal for PAPR control to correspond to a size that is controlled in a data transmitting apparatus. The angle demodulation unit performs angle demodulation of the phase signal. The normalizing and real signal inverse converter converts the angle-demodulated phase signal from a time domain to a plurality of data symbols of a frequency domain through fast Fourier transform (FFT). The symbol demapper generates a plurality of data signals by performing symbol demapping of the plurality of data symbols. The parallel to serial converter restores the receiving data by converting the plurality of data signals to a serial data signal.

The receiving signal processor may include: a multiplier that multiplies a signal that is multiplied by a baseband Q signal by the receiving data in the data transmitting apparatus; and an analog to digital (A/D) converter that converts an output signal of the multiplier to a digital signal and that outputs the phase signal from the digital signal.

The power compensation unit may include: a multiplier that compensates power by multiplying a first setting value by the phase signal; and a PAPR controller that has a first gain and that outputs a sine signal of the phase signal by dividing a power-compensated phase signal by the first gain.

A sine signal and a cosine signal may be generated through angle modulation in the data transmitting apparatus, size control for a PAPR of the sine signal may be performed, and the first setting value may be determined by an estimated value of a cosine signal that is generated in the data transmitting apparatus and an estimated value of a sine signal in which the size control is performed.

The normalizing and real signal inverse converter may include: a fast Fourier transform (FFT) unit that generates a plurality of data symbols by performing FFT of a plurality of input signals; a serial to parallel converter that converts an angle-demodulated phase signal from a serial signal to a parallel signal; and a signal processor that outputs a portion of the plurality of data symbols to the demapper.

Yet another embodiment of the present invention provides a method in which a data transmitting apparatus transmits data. The method includes: generating a plurality of modulation data symbols by symbol-mapping an input signal; converting the plurality of modulation data symbols to a real signal of a time domain from a frequency domain; performing angle modulation of the real number; controlling the size of a sine signal of the angle-modulated real number according to a predetermined gain; and converting and transmitting the angle-modulated real number to a radio frequency signal.

The controlling of the size may include varying the gain according to an input control signal.

Yet another embodiment of the present invention provides a method in which a data receiving apparatus receives data. The method includes: generating a phase signal corresponding to a real signal in a digital signal corresponding to the received data; compensating the size of the phase signal to correspond to a size that is controlled for PAPR control in a data transmitting apparatus; performing angle demodulation of the phase signal; converting the angle-demodulated phase signal from a time domain to a plurality of data symbols of a frequency domain; and generating a plurality of data signals and restoring the receiving data by performing symbol demapping of the plurality of data symbols.

Advantageous Effects

According to an exemplary embodiment of the present invention, because a PAPR can be changed from 0 dB according to a receiving environment, a problem due to a high PAPR, for example, a problem of distortion occurrence by modulation between mutual frequencies and non-linear distortion that is caused by a power amplifier, can be improved. Further, a service in consideration of both of a PAPR and receiving performance in an inverse proportion relationship according to a receiving environment can be provided without a change of a transmitter specification. For example, in VLC that uses light, by controlling the PAPR to 0 dB, flicker can be prevented from occurring, and in communication that uses wireless light instead of light such as infrared rays, by raising the PAPR, receiving performance can be improved.

DESCRIPTION OF THE DRAWINGS

FIG. 12 is a diagram illustrating an example of a receiving signal processor that is shown in FIG. 10.

FIG. 13 is a diagram illustrating another example of a receiving signal processor that is shown in FIG. 10.

MODE FOR INVENTION

Figure 1:
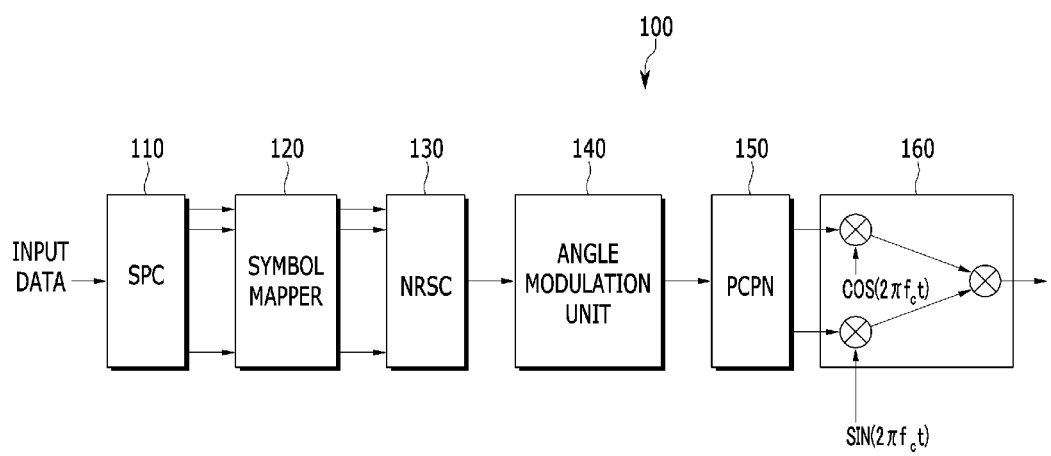
FIG. 1 is a diagram illustrating an OFDM transmitting apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In addition, in the specification and claims, unless explicitly described to the contrary, the word "comprise" and variations such as "comprises" or "comprising" will be understood to imply the inclusion of stated elements but not the exclusion of any other elements.

Hereinafter, a method and apparatus for transmitting/receiving data according to an exemplary embodiment of the present invention will be described in detail with reference to the drawings.

Figure 2:
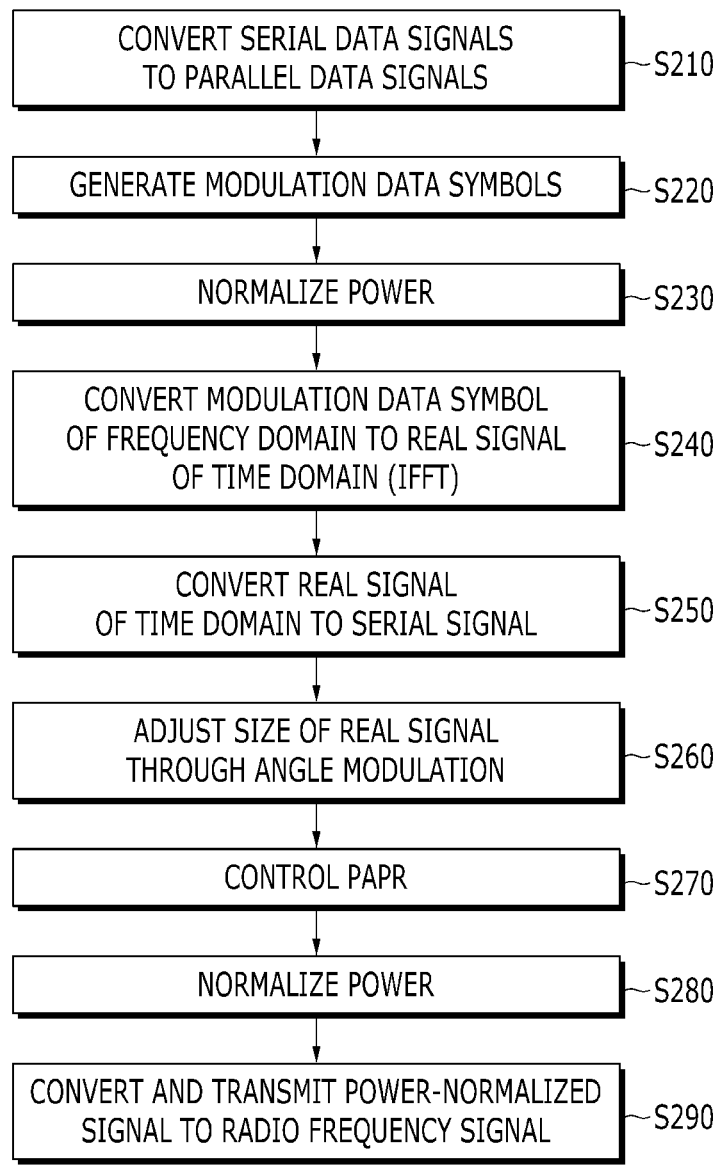
FIG. 2 is a flowchart illustrating a method of transmitting data of an OFDM transmitting apparatus according to an exemplary embodiment of the present invention.

FIG. 1 is a diagram illustrating an OFDM transmitting apparatus according to an exemplary embodiment of the present invention, and FIG. 2 is a flowchart illustrating a method of transmitting data of an OFDM transmitting apparatus according to an exemplary embodiment of the present invention.

Referring to FIG. 1, an OFDM transmitting apparatus 100 includes a serial to parallel converter (SPC) 110, a symbol mapper 120, a normalizing and real signal converter (NRSC) 130, an angle modulation unit 140, a peak-to-average power ratio (PAPR) control and power normalizing unit (PCPN) 150, and a signal transmitter 160.

Referring to FIG. 2, when a plurality of serial data signals corresponding to input data of a bit form are input, the SPC 110 converts the plurality of serial data signals to a plurality of parallel data signals (S210).

The symbol mapper 120 performs symbol mapping of a plurality of parallel data signals through digital modulation such as binary phase shift keying (BPSK), quadrature amplitude modulation (QAM), 16-QAM, and 64-QAM, thereby generating a plurality of modulation data symbols (S220).

The NRSC 130 normalizes average power of a plurality of modulation data symbols to be 1 (S230) and performs inverse fast Fourier transform (IFFT) of a normalized symbol, thereby converting a modulation data symbol of a frequency domain to a real signal of a time domain (S240). The NRSC 130 converts the real signal of a time domain to a serial signal (S250).

The angle modulation unit 140 performs angle modulation of the real signal that is normalized by the NRSC 130 and thus adjusts the size of the real signal (S260). As an angle modulation method, a phase modulation method may be used.

The PCPN 150 controls the PAPR by adjusting the size of a sine component of the angle-modulated signal according to the input gain value (S270), and normalizes power (S280).

Next, the signal transmitter 160 multiplies A by a real number component of a power-normalized signal, multiplies B by an imaginary component of the power-normalized signal, and adds the two components, thereby converting the power-normalized signal to a radio frequency signal. In this case, A may be $\cos(2\pi f_c t)$ or $\sin(2\pi f_c t)$, and B may be $\cos(2\pi f_c t)$ or $\sin(2\pi f_c t)$ and may have a different value from that of A. $f_c$ is a wireless frequency. FIG. 1 illustrates that A is $\cos(2\pi f_c t)$ and B is $\sin(2\pi f_c t)$. Alternatively, the signal transmitter 160 may multiply −B by an imaginary component of a power-normalized signal. The signal transmitter 160 transmits a radio frequency signal (S290). A radio frequency signal that is transmitted from the OFDM transmitting apparatus 100 may be defined as an OFDM signal.

Hereinafter, the OFDM transmitting apparatus 100 will be described in detail with reference to FIGS. 3 to 9.

Figure 3:
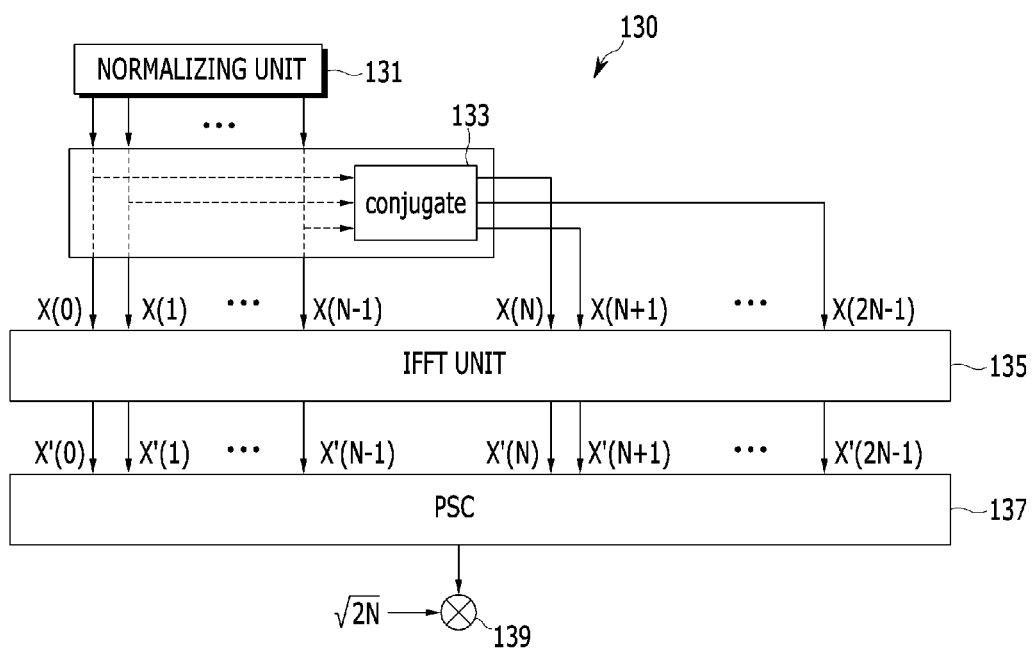
FIG. 3 is a diagram illustrating a normalizing and real signal converter (NRSC) that is shown in FIG. 1.
Figure 4:
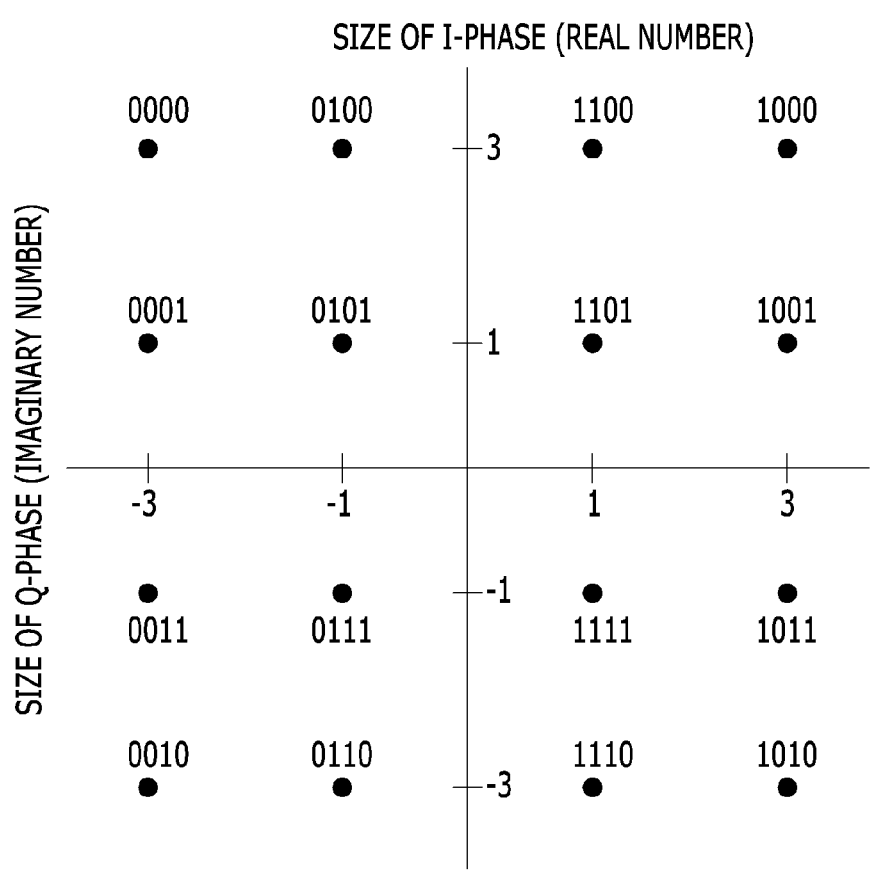
FIG. 4 is a diagram illustrating an example of a modulation data symbol in which symbol mapping is performed by digital modulation in a symbol mapper of FIG. 1.
Figure 5:
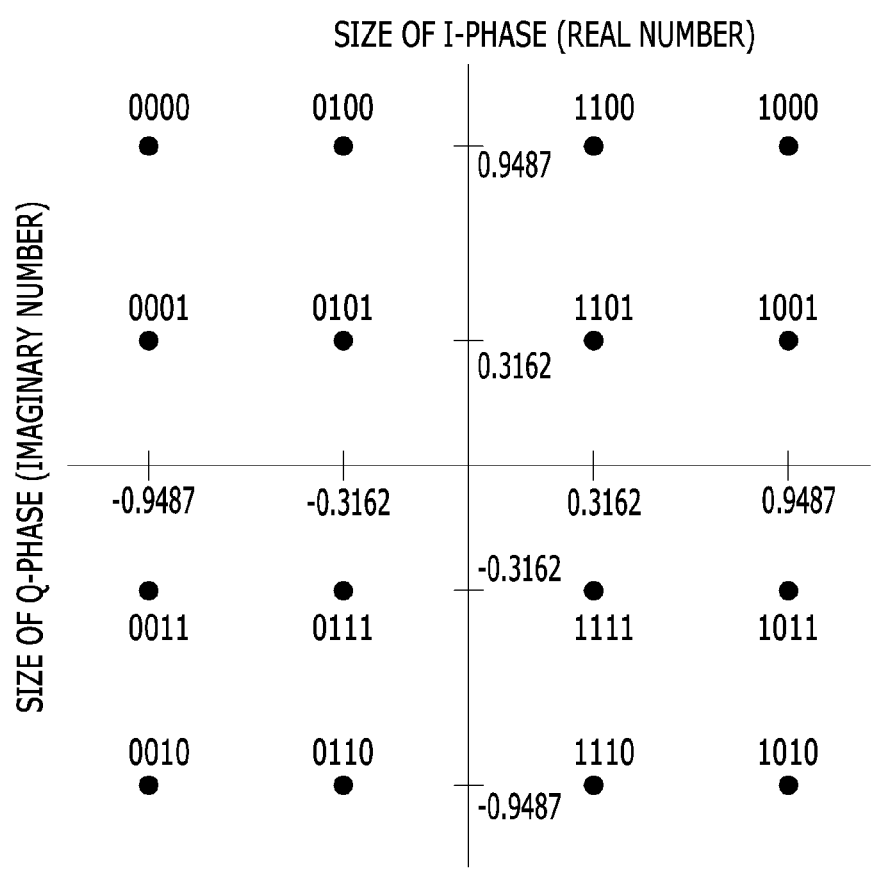
FIG. 5 is a diagram illustrating an example of a normalized modulation data symbol in an NRSC of FIG. 1.

FIG. 3 is a diagram illustrating the NRSC that is shown in FIG. 1, FIG. 4 is a diagram illustrating an example of a modulation data symbol in which a symbol is mapped by digital modulation in the symbol mapper of FIG. 1, and FIG. 5 is a diagram illustrating an example of a normalized modulation data symbol in the NRSC of FIG. 1.

Referring to FIG. 3, the NRSC 130 includes a normalizing unit 131, an input signal processor 133, an IFFT unit 135, a parallel to serial converter (PSC) 137, and a multiplier 139.

The symbol mapper 120 maps a plurality of parallel data signals to a modulation data symbol that expresses a position in a constellation according to a modulation method such as BPSK, QAM, 16-QAM, and 64-QAM, and the modulation data symbol may be the same as that of FIG. 4.

In order to normalize the modulation data symbol, the normalizing unit 131 obtains an average value by obtaining and squaring an absolute value of the modulation data symbol, obtains a square root of the obtained average value, and divides the modulation data symbol by the square root, thereby normalizing average power to be 1.

For example, the symbol mapper 120 maps a plurality of parallel data signals to a modulation data symbol that expresses a position in a constellation according to a modulation method such as BPSK, QAM, 16-QAM, and 64-QAM, and the modulation data symbol may be the same as that of FIG. 4.

When the modulation data symbol is the same as that of FIG. 4, an average value becomes $$10\left(=\frac{2\times 2}{4}\sum [1^2+3^2]=10\right),$$

and by multiplying $1/\sqrt{100}$ by the modulation data symbol, the modulation data symbol can be normalized, and the normalized modulation data symbol may be the same as that of FIG. 5.

In order to convert the modulation data symbol that is normalized by the normalizing unit 131 to a real signal of a time domain, the input signal processor 133 inputs the normalized modulation data symbol as input signals [X(0), X(1), . . . , X(N−1), X(N), X(N+1), . . . , X(2N−1)] of the IFFT unit 135. Here, N (exponent multiplication of 2) represents the number of modulation data symbols, and when the number of modulation data symbols is N, a size of the IFFT may be 2N.

That is, the input signal processor 133 uses modulation data symbols of the N number to input signals [X(0), X(1), . . . , X(N−1), X(N), X(N+1), . . . , X(2N−1)] of the IFFT unit 135, and conjugates and uses N modulation data symbols with input signals [X(N), X(N+1), . . . , X(2N−1)] of the IFFT unit 135. A 0th modulation data symbol is 0, and thus a modulation data symbol that is input to input signals [X(0), X(N)] becomes 0. That is, N data symbols are used as input signals [X(1), . . . , X(N−1)], and by conjugating a modulation data symbol of an input signal [X(2N−k)], the conjugated modulation data symbol is used as input signals [X(N+1), . . . , X(2N−1)]. Here, k is N+1, N+2, . . . , 2N−1.

When input signals [X(0), X(1), . . . , X(N−1), X(N), X(N+1), . . . , X(2N−1)] are input to the IFFT unit 135, the IFFT unit 135 performs IFFT of the input signals [X(0), X(1), . . . , X(N−1), X(N), X(N+1), . . . , X(2N−1)]. Therefore, the modulation data symbol is converted to real signals [X'(0), X'(1), . . . , X'(N−1), X'(N), X'(N+1), . . . , X'(2N−1)] of a time domain from a frequency domain.

The PSC 137 converts a real signal of a time domain from a parallel signal to a serial signal.

The multiplier 139 normalizes a serial real signal by multiplying $\sqrt{2N}$ by the serial real signal.

Figure 6:
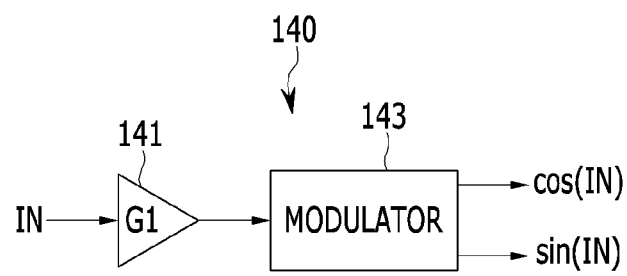
FIG. 6 is a diagram illustrating an angle modulation unit that is shown in FIG. 1.
Figure 7:
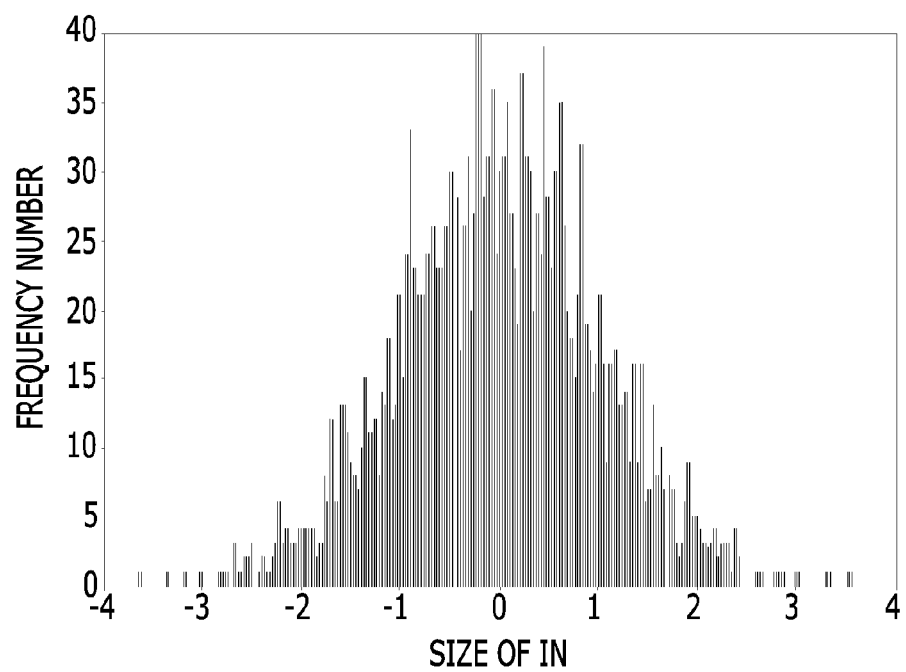
FIG. 7 is a graph illustrating phase size distribution of an input signal of an angle modulation unit.
Figure 8:
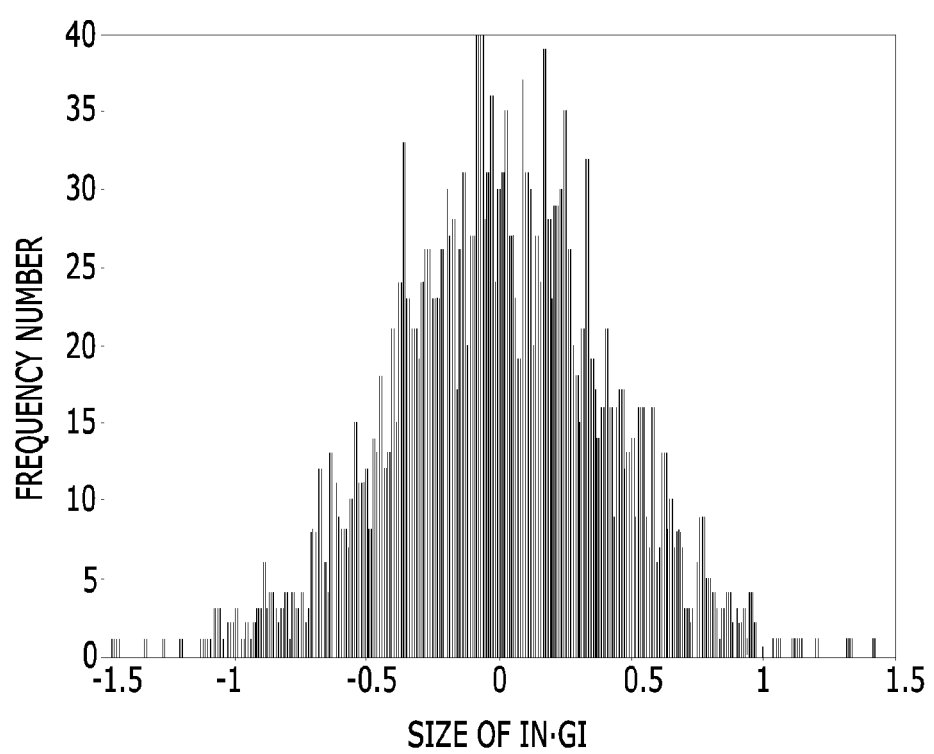
FIG. 8 is a graph illustrating phase size distribution of an output signal of an angle modulation unit.

FIG. 6 is a diagram illustrating the angle modulation unit that is shown in FIG. 1, FIG. 7 is a graph illustrating phase size distribution of an input signal of an angle modulation unit, and FIG. 8 is a graph illustrating phase size distribution of an output signal of an angle modulation unit.

Referring to FIG. 6, the angle modulation unit 140 includes a phase controller 141 and a modulator 143.

The phase controller 141 inputs a real signal that is normalized from the NRSC 130 as the input signal IN. The phase controller 141 varies a gain G1 so that the size of the input signal IN is in a range of −π/2 to π/2 and adjusts the size of the input signal IN. Here, π is a circular constant.

For example, when the size of the input signal IN of the phase controller 141 is the same as that of FIG. 8, the phase controller 141 may adjust the size of the input signal IN by multiplying 0.4 as a gain by the input signal IN so that the size of the input signal IN is in a range of −π/2 to π/2. Therefore, as shown in FIG. 8, the phase size of the input signal IN may be in a range of −π/2 to π/2.

The modulator 143 performs angle modulation of a real signal that is adjusted by the phase controller 141 to a cosine signal and a sine signal [cos(IN), sin(IN)].

Figure 9:
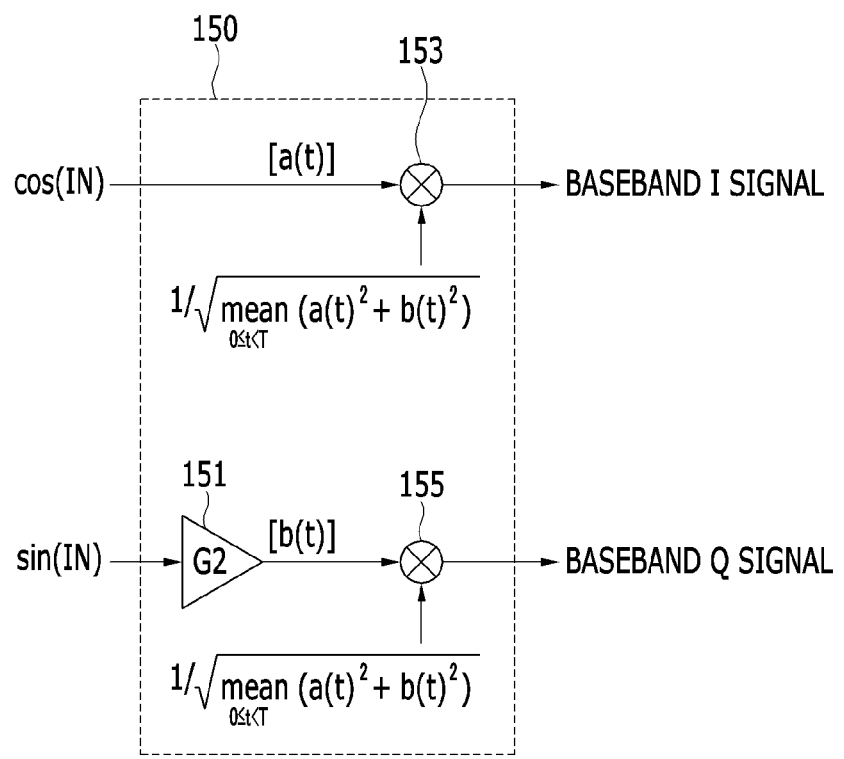
FIG. 9 is a diagram illustrating a PAPR control and power normalizing unit (PCPN) that is shown in FIG. 1.

FIG. 9 is a diagram illustrating the PCPN that is shown in FIG. 1.

Referring to FIG. 9, the PCPN 150 includes a PAPR controller 151 and multipliers 153 and 155. The multipliers 153 and 155 can operate as power normalizing units for power normalizing.

A cosine signal [cos(IN)], which is an output signal of the modulator 143, is represented as a(t) in FIG. 9 for convenience of display.

A cosine signal [a(t)], which is an output signal of the modulator 143, is input to the multiplier 153 not via the PAPR controller 151, and sin(IN), which is an output signal of the modulator 143, is input to the PAPR controller 151.

The PAPR controller 151 controls a gain G2 according to the input control signal and adjusts the size of the sine signal [sin(IN)] that is input according to the gain G2. In this case, the control signal may include a gain value to control.

That is, the PAPR controller 151 controls the PAPR by adjusting only the size of a sine component of a signal in which an angle is modulated. The sine signal [b(t)] that is adjusted by the PAPR controller 151 is input to the multiplier 155.

In general, a PAPR within one OFDM symbol is expressed by Equation 1. A guard interval is generally inserted into a serial signal of a time domain that is output from the NRSC 130, and the sum of a signal corresponding to the guard interval and one modulation data symbol is referred to as an OFDM symbol.

$$10 \times \log\left(\frac{\max_{t\in[0,T)} |x(t)|^2}{E\{|x(t)|^2\}}\right) \quad [\text{Equation 1}]$$

Here, E {.} is an expected value, and T is a cycle of one OFDM symbol.

In this case, a PAPR(dB) according to an exemplary embodiment of the present invention may be expressed with Equations 2 and 3.

$$10 \times \log\left(\frac{\max_{t\in[0,T)} (a(t)^2 + b(t)^2)}{E\{a(t)^2 + b(t)^2\}}\right) \quad [\text{Equation 2}]$$

$$10 \times \log\left(\frac{\max_{t\in[0,T)} (a(t)^2 + b(t)^2)}{E\{a(t)^2 + Gain^2 \times \sin(IN(t))^2\}}\right) \quad [\text{Equation 3}]$$

In Equation 3, Gain is a gain G2 of the PAPR controller 151, and when Gain is 1, the PAPR becomes 0 dB.

Particularly, as can be seen through Equation 3, the PAPR is changed according to Gain. That is, because the gain G2 can be controlled using a control signal according to a receiving environment, the PAPR can also be controlled.

For example, when the gain G1 of the phase controller 141 that is shown in FIG. 6 is 0.4 and the size of IFFT is 2048, in 16 QAM modulation, a PAPR may be changed according to the gain G2 of the PAPR controller 151, as shown in Table 1.

TABLE 1

| PAPR(dB) | G2 |
|---|---|
| 0 | 1 |
| 2.8 | 1.5 |
| 4.5 | 2 |
| 5.6 | 2.5 |
| 6.3 | 3 |

For power normalization, a value of C is multiplied by a cosine signal [a(t)] and a sine signal [b(t)] in which the size is adjusted. C is the same as Equation 4.

$$1 \bigg/ \sqrt{\operatorname*{mean}_{0 \leq t < T}(a(t)^2 + b(t)^2)} \quad [\text{Equation 4}]$$

That is, the multiplier 153 normalizes power by multiplying C by a cosine signal [a(t)], and the multiplier 155 normalizes power by multiplying C by a sine signal [b(t)].

When a cosine signal in which power is normalized is referred to as a baseband I signal and a sine signal in which power is normalized is referred to as a baseband Q signal, $\cos(2\pi f_c t)$ and $\sin(2\pi f_c t)$ are multiplied by and added to the baseband I signal and the baseband Q signal, respectively, and are converted to a radio frequency signal.

Figure 10:
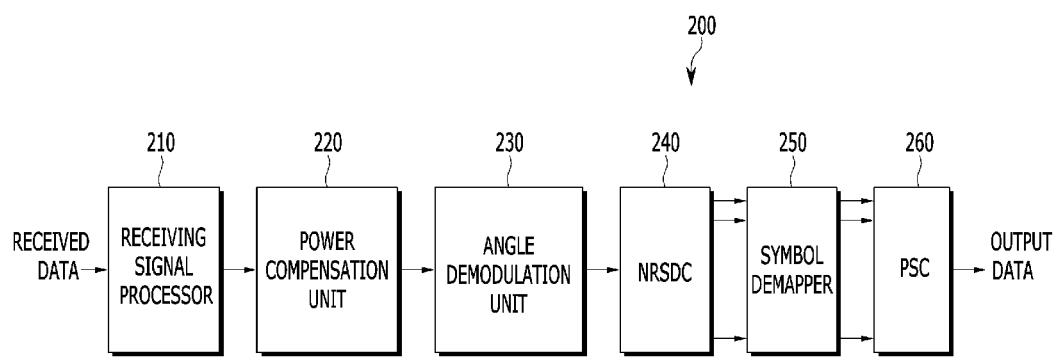
FIG. 10 is a diagram illustrating an OFDM receiving apparatus according to an exemplary embodiment of the present invention.
Figure 11:
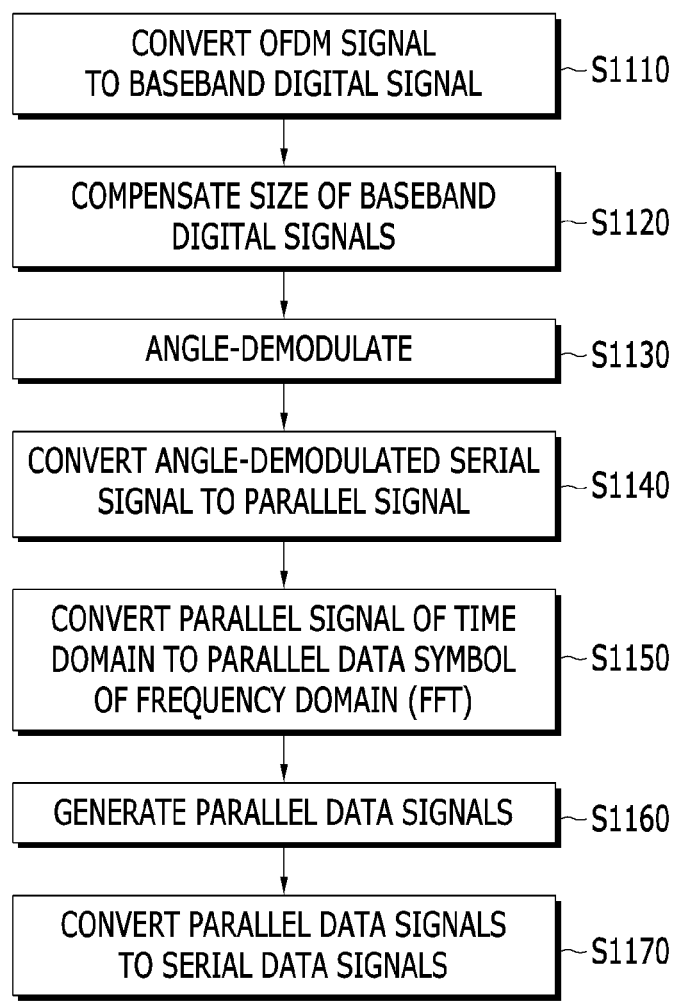
FIG. 11 is a flowchart illustrating a method of receiving data of an OFDM receiving apparatus according to an exemplary embodiment of the present invention.

FIG. 10 is a diagram illustrating an OFDM receiving apparatus according to an exemplary embodiment of the present invention, and FIG. 11 is a flowchart illustrating a method of receiving data of an OFDM receiving apparatus according to an exemplary embodiment of the present invention.

Referring to FIG. 10, an OFDM receiving apparatus 200 includes a receiving signal processor 210, a power compensation unit 220, an angle demodulation unit 230, a normalizing and real signal de-converter (NRSDC) 240, a symbol demapper 250, and a PSC 260. Such an OFDM receiving apparatus 200 performs operation of an inverse process of the OFDM transmitting apparatus 100.

Referring to FIG. 11, when the receiving signal processor 210 receives an OFDM signal as receiving data, after multiplying A' by a real number component of the OFDM signal and B' by an imaginary component of a power-normalized signal, the receiving signal processor 210 converts from a passband analog signal to a plurality of baseband digital signals through analog digital conversion (S1110). Here, A' and B' may be the same as A and B of the OFDM receiving apparatus 200, and B' may be −B. A' may be $\cos(2\pi f_c t)$ or $\sin(2\pi f_c t)$, and B' may be $\cos(2\pi f_c t)$ or $\sin(2\pi f_c t)$ and may have a different value from that of A'. $f_c$ is a wireless frequency.

The power compensation unit 220 compensates a plurality of baseband digital signals with a size that is adjusted in the PAPR controller 151 (S1120).

The angle demodulation unit 230 performs angle demodulation of a plurality of baseband digital signals in which the size is compensated by the power compensation unit 220 (S1130).

The NRSDC 240 converts the angle-demodulated signal from a serial signal to a parallel signal (S1140), performs FFT on the converted parallel signal, and converts from a parallel signal of a time domain to a parallel data symbol of a frequency domain (S1150).

The symbol demapper 250 generates a plurality of parallel data signals by demapping to a parallel data symbol of a frequency domain that is output from the NRSDC 240 through digital demodulation such as BPSK, QAM, 16-QAM, and 64-QAM (S1160).

The PSC 260 converts and outputs a plurality of parallel data signals that are output from the symbol demapper 250 to a plurality of serial data signals (S1170), and thus an OFDM signal is restored to a data signal.

Hereinafter, the OFDM receiving apparatus 200 will be described in detail with reference to FIGS. 12 to 16.

FIG. 12 is a diagram illustrating an example of a receiving signal processor that is shown in FIG. 10, and FIG. 13 is a diagram illustrating another example of a receiving signal processor that is shown in FIG. 10.

Referring to FIG. 12, the receiving signal processor 210 includes multipliers 211 and 213, low pass filters (LPF) 215 and 217, and an analog to digital converter (ADC) 219.

The multiplier 211 converts the received OFDM signal to a cosine signal or a sine signal by multiplying A' by the received OFDM signal, and outputs the cosine signal or the sine signal to the LPF 215. FIG. 12 illustrates that A' is cos(2πf$_c$t), and in this case, a signal that is output from the multiplier 211 may be a cosine signal.

The multiplier 213 converts the received OFDM signal to a cosine signal or a sine signal by multiplying B' by the received OFDM signal, and outputs the cosine signal or the sine signal to the LPF 217. FIG. 12 illustrates that B' is sin(2πf$_c$t), and a signal that is output from the multiplier 211 may be a sine signal.

Here, A' may be cos(2πf$_c$t) or sin(2πf$_c$t), and B' may be cos(2πf$_c$t) or sin(2πf$_c$t) and may have a different value from that of A'.

The LPFs 215 and 217 filter a cosine signal and a sine signal that are input from the multipliers 211 and 213, respectively, and pass through only a desired band of signal from the input signal.

The ADC 219 converts a cosine signal and a sine signal that pass through the LPFs 215 and 217 to a digital signal through analog digital conversion and then outputs a phase from one digital signal. The ADC 219 outputs a phase from a digital signal that is generated when a signal A' or B' that the OFDM transmitting apparatus 100 multiplied by a baseband Q signal to become the OFDM signal.

Alternatively, referring to FIG. 13, a receiving signal processor 210' may further include a switching unit 212, compared with the receiving signal processor 210 that is shown in FIG. 12.

The switching unit 212 outputs the received OFDM signal to the multiplier 211 or the multiplier 213 so that a signal [cos(2πf$_c$t) or sin(2πf$_c$t)] that is multiplied by the baseband Q signal in the OFDM transmitting apparatus 100 may be multiply to the received OFDM signal. For example, in the OFDM transmitting apparatus 100, when sin(2πf$_c$t) is multiplied by the baseband Q signal and the baseband Q signal is converted to a radio frequency signal, the switching unit 212 may output the OFDM signal to the multiplier 213.

In the OFDM transmitting apparatus 100, when a symbol (−) is multiplied by a signal [cos(2πf$_c$t) or sin(2πf$_c$t)] that is multiplied by the baseband Q signal, the ADC 219 can multiply a symbol (−) to the output phase.

Figure 14:
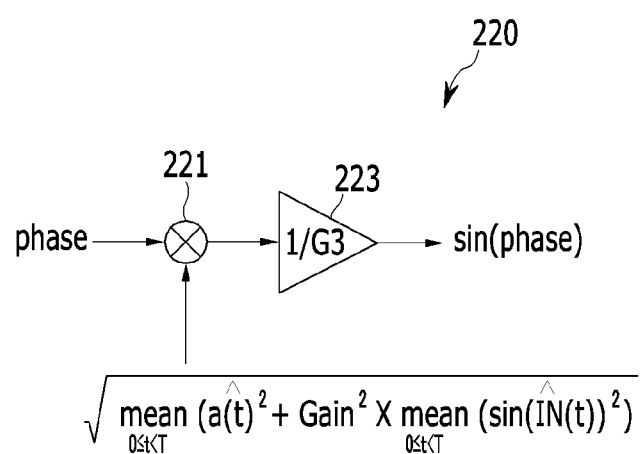
FIG. 14 is a diagram illustrating a power compensation unit that is shown in FIG. 10.

FIG. 14 is a diagram illustrating the power compensation unit that is shown in FIG. 10.

Referring to FIG. 14, the power compensation unit 220 includes a multiplier 221 and a PAPR controller 223.

The multiplier 221 compensates power by multiplying D by a phase that is output from the receiving signal processor 210 or 210' and outputs the power to the PAPR controller 223. In this case, D may be represented by Equation 5.

$$\sqrt{\underset{0\leq t<T}{mean}(a(\hat{t})^2) + Gain^2 \times \underset{0\leq t<T}{mean}(\sin(I\hat{N}(t))^2)}$$ [Equation 5]

Here, T is a cycle of an OFDM symbol. $a(\hat{t})$ is an estimate of a cosine signal [(a(t) in FIG. 9] in the OFDM transmitting apparatus 100, and $\sin(\hat{IN}(t))$ is an estimate of a sine signal [sin(IN(t)) in FIG. 9] of the OFDM transmitting apparatus 100. Further, Gain is a gain G3 of the PAPR controller 223.

Because a signal in which IFFT is performed is a random signal, $$\underset{0\leq t<T}{mean}(a(\hat{t})^2) \text{ and } \underset{0\leq t<T}{mean}(\sin(\hat{IN}(t))^2)$$

cannot be accurately obtained. Therefore, an error can be reduced by repeatedly averaging several times, and an estimate according to the gain G1 of the phase controller (141 in FIG. 6) of the OFDM transmitting apparatus 100 may be the same as that of Table 2.

TABLE 2

| G1 | $\underset{0\leq t<T}{mean}(a(\hat{t})^2)$ | $\underset{0\leq t<T}{mean}(\sin(I\hat{N}(t))^2)$ |
|---|---|---|
| 0.5 | 0.81 | 0.19 |
| 0.45 | 0.84 | 0.16 |
| 0.4 | 0.87 | 0.13 |
| 0.35 | 0.9 | 0.1 |
| 0.3 | 0.92 | 0.08 |

The PAPR controller 223 divides a signal in which power is compensated by the multiplier 221 by a gain G3 of the PAPR controller 223 and outputs a sine signal [sin(phase)]. The gain G3 of the PAPR controller 223 is the same as the gain G2 of the PAPR controller 151. For example, when the gain G1 of the phase controller (141 in FIG. 6) is 0.4 and the gain G3 of the PAPR controller 223 is 2, D is 1.179. When a value of which 1.179 is multiplied by the phase is divided by 2, a sine signal [sin(phase)] is generated.

Figure 15:
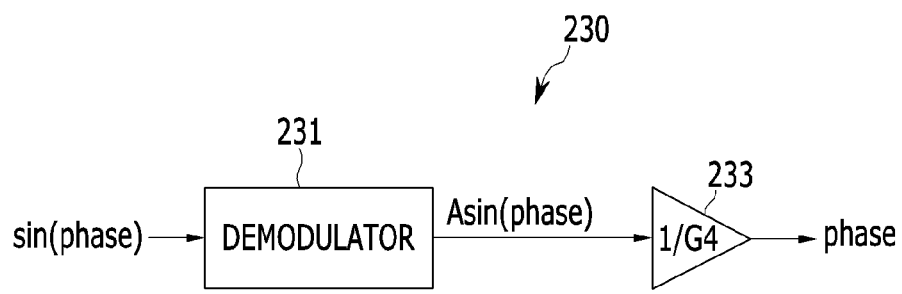
FIG. 15 is a diagram illustrating an angle demodulation unit that is shown in FIG. 10.

FIG. 15 is a diagram illustrating the angle demodulation unit that is shown in FIG. 10.

Referring to FIG. 15, the angle demodulation unit 230 includes a demodulator 231 and a phase controller 233.

The demodulator 231 obtains inverse sine, i.e., an inverse sine value [A sin(phase)] of a sine signal [sin(phase)] that is output from the power compensation unit 220 and outputs the inverse sine value [A sin(phase)] to the phase controller 233.

An inverse function [Inverse sine(z)] of a sine signal [sin (z)] can be obtained by Equation 6.

$$\text{Inverse sine}(z) = -j \times \log(j \times z + \sqrt{(1-z^2)}))$$ [Equation 6]

Here, j is an imaginary unit of a complex number, and $j^2=1$.

The phase controller 233 has a gain G4, divides an inverse sine value [A sin(phase)] from the demodulator 231 by a gain G4, and outputs a phase. Here, the gain G4 is the same as the gain G1 of the phase controller 141 of the angle modulation unit 140.

Figure 16:
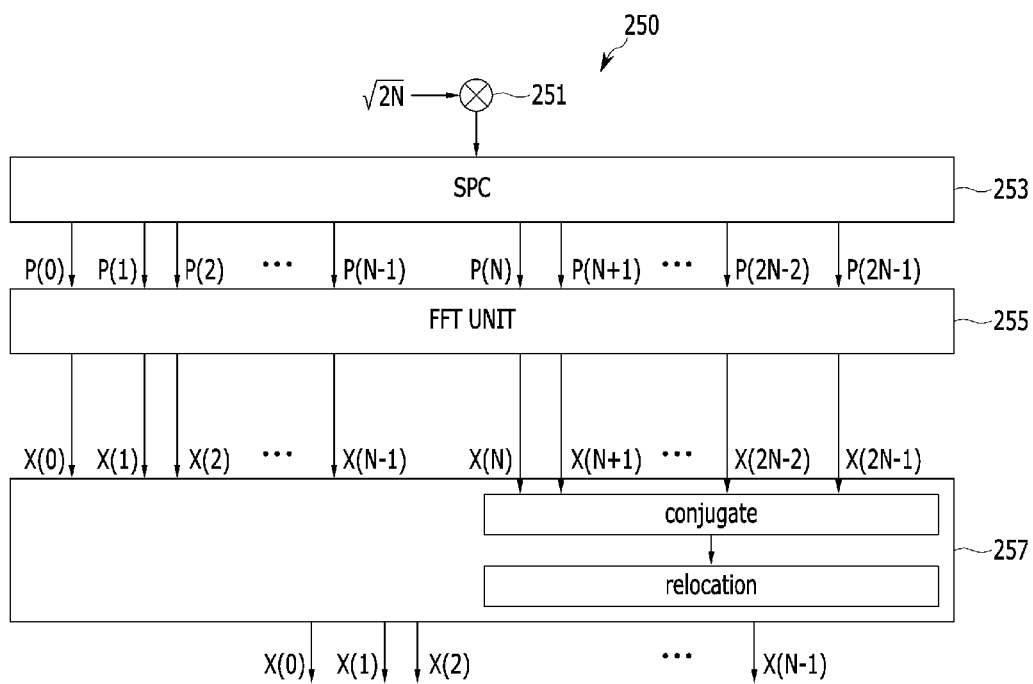
FIG. 16 is a diagram illustrating a normalizing and real signal de-converter (NRSDC) that is shown in FIG. 10.

FIG. 16 is a diagram illustrating the NRSDC that is shown in FIG. 10.

Referring to FIG. 16, the NRSDC 240 includes a multiplier 251, an SPC 253, an FFT unit 255, and a signal processor 257.

The multiplier 251 normalizes a real signal by multiplying $1/\sqrt{2N}$ by the real signal that is output from the angle demodulation unit 230 and outputs the real signal to the SPC 253.

In order to perform FFT of a normalized signal, the SPC 253 converts a signal that is normalized by the multiplier 251 from a serial signal to a parallel signal and outputs the converted signal to the FFT unit 255.

When a parallel signal that is converted by the SPC 253 is input as input signals [P(0), P(1), . . . , P(N−1), P(N), P(N+1), . . . , P(2N−1)] of the FFT unit 255, the FFT unit 255 performs FFT on the input signals [P(0), P(1), . . . , P(N−1), P(N), P(N+1), . . . , P(2N−1)]. Therefore, the input signals [P(0), P(1), . . . , P(N−1), P(N), P(N+1), . . . , P(2N−1)] are converted to data symbols [X(0), X(1), . . . , X(N−1), X(N), X(N+1), . . . , X(2N−1)] of a frequency domain from a time domain.

The signal processor 257 outputs signals [X(0), X(1), ..., X(N−1)] of a frequency domain among data symbols [X(0), X(1), ..., X(N−1), X(N), X(N+1), ..., X(2N−1)] of a frequency domain to the symbol demapper 250. In this case, the signal processor 257 may output data symbols [X(0), X(1), ..., X(N−1)] to the symbol demapper 250. The signal processor 257 conjugates data symbols [X(N+1), ..., X(2N−1)] of a frequency domain, relocates a data symbol at a position of X(2N−k), and outputs the data symbol to the symbol demapper 250. Here, k is N+1, N+2, ..., 2N−1. For example, in the symbol [X(2N−1)] of a frequency domain after FFT is performed, the signal processor 257 may conjugate the symbol [X(2N−1)] of a frequency domain and relocate the symbol [X(2N−1)] at a position of X(1).

The symbol demapper 250 demaps each data symbol to a plurality of parallel data signals in a constellation according to a demodulation method corresponding to the symbol mapper 120 of the OFDM transmitting apparatus 100, and the plurality of parallel data signals are output to the PSC 260. Therefore, the PSC 260 restores data by converting the plurality of parallel data signals to a plurality of serial data signals.

The above-described exemplary embodiment of the present invention may be not only embodied through an apparatus and method but also through a program that executes a function corresponding to a configuration of the exemplary embodiment of the present invention or through a recording medium on which the program is recorded, and can be easily embodied by a person of ordinary skill in the art from the description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A data transmitting apparatus comprising:
   a symbol mapper that generates a plurality of modulation data symbols by performing symbol mapping of an input signal;
   a normalizing and real signal converter that converts the plurality of modulation data symbols to a real signal of a time domain from a frequency domain;
   an angle modulation unit that performs angle modulation of the real signal;
   a peak-to-average power ratio (PAPR) control and power normalizing unit that controls the size of a sine component of an angle-modulated real signal according to a first gain and that power-normalizes a sine component and a cosine component of the real signal; and
   a signal transmitter that converts and transmits the power-normalized real signal to a radio frequency signal.

2. The data transmitting apparatus of claim 1, wherein the PAPR control and power normalizing unit varies the first gain according to an input control signal.

3. The data transmitting apparatus of claim 1, wherein the normalizing and real signal converter comprises a normalizing unit that normalizes power of the plurality of modulation data symbols so that average power of the plurality of modulation data symbols becomes 1.

4. The data transmitting apparatus of claim 1, wherein the normalizing and real signal converter comprises:
   an inverse fast Fourier converter that performs inverse fast Fourier conversion of a plurality of input signals; and
   an input signal processor that outputs the plurality of modulation data symbols and a plurality of conjugate complex symbols that are generated by conjugating the plurality of modulation data symbols to the inverse fast Fourier converter.

5. The data transmitting apparatus of claim 4, wherein when the number of the plurality of modulation data symbols is N, the input signal processor positions the N number of modulation data symbols at positions of input signals from 0 to an (N−1)st and positions the plurality of conjugate complex symbols at positions of input signals from N to a (2N−1)st,
   the input signal processor positions a complex conjugate symbol of a (2N−k)th input signal at positions of input signals from (N+1)st to (2N−1)st,
   the N is a positive integer, and k is a value from N+1 to 2N−1.

6. The data transmitting apparatus of claim 1, wherein the angle modulation unit comprises:
   a phase controller that controls the size of the real signal according to a second gain; and
   a modulator that angle-modulates the real signal to a cosine signal and a sine signal.

7. The data transmitting apparatus of claim 1, wherein the PAPR control and power normalizing unit comprises:
   a PAPR controller that controls the size of a sine component of the angle-modulated real signal according to the first gain;
   a first multiplier that generates a baseband I signal by multiplying a setting value for power normalization by a cosine component of the real signal; and
   a second multiplier that generates a baseband Q signal by multiplying the setting value by a sine component of the real signal of which the size is controlled according to the first gain.

8. The data transmitting apparatus of claim 7, wherein a PAPR becomes 0 when the first gain is 1.

9. The data transmitting apparatus of claim 7, wherein the signal transmitter generates the radio frequency signal by multiplying a second setting value by the baseband I signal and multiplying a third setting value by the baseband Q signal and adding the multiplied signals,
   the second setting value is one of a sine function and a cosine function of the wireless frequency, and
   the third setting value is different from the second setting value of a sine function and a cosine function of the wireless frequency.

10. A data receiving apparatus comprising:
    a receiving signal processor that outputs a phase signal from a digital signal corresponding to received data;
    a power compensation unit that compensates the size of the phase signal corresponding to a size that is controlled for PAPR control in a data transmitting apparatus;
    an angle demodulation unit that performs angle demodulation of the phase signal;
    a normalizing and real signal inverse converter that converts the angle-demodulated phase signal from a time domain to a plurality of data symbols of a frequency domain through fast Fourier transform (FFT);
    a symbol demapper that generates a plurality of data signals by performing symbol demapping of the plurality of data symbols; and
    a parallel to serial converter that restores the receiving data by converting the plurality of data signals to a serial data signal.

11. The data receiving apparatus of claim 10, wherein the receiving signal processor comprises:

a multiplier that multiplies a signal that is multiplied by a baseband Q signal in the data transmitting apparatus by the receiving data; and an analog to digital (A/D) converter that converts an output signal of the multiplier to a digital signal and that outputs the phase signal from the digital signal.

12. The data receiving apparatus of claim 10, wherein the power compensation unit comprises:

a multiplier that compensates power by multiplying a first setting value by the phase signal; and a PAPR controller that has a first gain and that outputs a sine signal of the phase signal by dividing a power-compensated phase signal by the first gain.

13. The data receiving apparatus of claim 12, wherein a sine signal and a cosine signal are generated through angle modulation in the data transmitting apparatus, size control for a PAPR of the sine signal is performed, and the first setting value is determined by an estimated value of a cosine signal that is generated in the data transmitting apparatus and an estimated value of a sine signal in which the size control is performed.

14. The data receiving apparatus of claim 10, wherein the normalizing and real signal inverse converter comprises:

a fast Fourier transform (FFT) unit that generates a plurality of data symbols by performing FFT of a plurality of input signals;

a serial to parallel converter that converts an angle-demodulated phase signal from a serial signal to a parallel signal; and a signal processor that outputs a portion of the plurality of data symbols to the demapper.

15. A method in which a data transmitting apparatus transmits data, the method comprising:

generating a plurality of modulation data symbols by symbol-mapping an input signal;

converting the plurality of modulation data symbols to a real signal of a time domain from a frequency domain;

performing angle modulation of the real number;

controlling the size of a sine signal of the angle-modulated real number according to a predetermined gain; and converting and transmitting the angle-modulated real number to a radio frequency signal.

16. The method of claim 15, wherein the controlling of the size comprises varying the gain according to an input control signal.

17. The method of claim 15, further comprising normalizing power of a sine component and a cosine component of the real signal before the controlling of the size.

18. The method of claim 15, wherein the converting of the plurality of modulation data symbols comprises:

performing inverse fast Fourier transform on a plurality of input signals;

setting the plurality of modulation data symbols and a plurality of conjugate complex symbols in which the plurality of modulation data symbols are conjugated as a plurality of input signals for inverse fast fourier transform;

positioning the plurality of modulation data symbols at positions of input signals from 0 to an (N−1)st, positioning the plurality of conjugate complex symbols at positions of input signals from N to a (2N−1)st, and positioning a conjugate complex symbol of a (2N−k)th input signal at positions of input signals from (N+1) to a (2N−1)st input signal; and performing inverse fast Fourier transform (IFFT) on the plurality of input signals, wherein the N is a positive integer, and k is a value from N+1 to 2N−1.

19. A method in which a data receiving apparatus receives data, the method comprising:

generating a phase signal corresponding to a real signal in a digital signal corresponding to the received data;

compensating the size of the phase signal to correspond to a size that is controlled for PAPR control in a data transmitting apparatus;

performing angle demodulation of the phase signal;

converting the angle-demodulated phase signal from a time domain to a plurality of data symbols of a frequency domain; and generating a plurality of data signals and restoring the receiving data by performing symbol demapping of the plurality of data symbols.

20. The method of claim 19, wherein the converting of the angle-demodulated phase signal comprises:

converting the angle-demodulated phase signal from a serial signal to a parallel signal;

performing fast Fourier transform of the parallel signal and a plurality of conjugate complex signals that are generated by conjugating the parallel signal; and selecting a portion of a data symbol in which fast Fourier transform is performed as the plurality of data symbols.

* * * * *